United States Patent Office 3,575,968
Patented Apr. 20, 1971

3,575,968
DITHIOLE COMPOUNDS AND PREPARATION
Erwin Klingsberg, Mountainside, Union County, N.J., assignor to American Cyanamid Company, Stamford, Conn.
No Drawing. Filed Mar. 12, 1968, Ser. No. 712,384
Int. Cl. C07d 7/00; C09b 49/00
U.S. Cl. 260—240                    18 Claims

ABSTRACT OF THE DISCLOSURE 1,2-dithiole or 1,2-dithiolium compounds, useful as dyes or herbicides, of the following formulas where R is hydrogen or phenyl; R' is alkyl, cycloalkyl, aralkyl, aryl, heteroaryl; R'' is alkyl; and A⁻ is an anion such as halide:

[structures shown]

This invention pertains to heterocyclic carbon compounds, hetero-S-containing. The hetero-S moiety of the compounds of this invention is a 1,2-dithiole or 1,2-dithiolium ring. Related compounds are disclosed in U.S. Pat. 3,211,749 to Klingsberg and J. Am. Chem. Soc. 85, 3244 (1963).

The present invention concerns methylated thiothiophthene salts, imines or amines related to thiothiophthene, their N-alkyl and S-alkyl derivatives, and methods of preparation. These compounds are valuable for dyeing fibers, especially synthetics, when applied in the conventional manner. Further, they are useful as herbicides and as chemical intermediates.

The compounds of the invention may be classified as follows:

Methiodides or methotriodides of thiothiophthenes (I)

[structure]

where R is hydrogen or phenyl and A⁻ is an anion.

N-alkylimines and salts (II)

[structure]

where R is hydrogen or phenyl, R' is alkyl, cycloalkyl, aralkyl, aryl or heteroaryl, and including the methiodide and methotriodide salts of II.

Alkylthiovinyl isothiazolium salts (III)

[structures]

III where R and R' are the same as above, R'' is alkyl, and A⁻ is an anion. It is intended that the resonance form, shown above, while not expressly set forth in the appended claims nevertheless be covered by the claims as an obvious equivalent.

Bridged diimine compounds (IV)

[structure]

where R is the same as above.

N-substituted aminovinyl 1,2-dithiolium salts (V)

[structures]

V where R, R', R'' and A⁻ are the same as above. The resonance form is also shown and is intended to be covered by the claims as an obvious equivalent.

In the above compounds an illustrative aryl group is phenyl or substittued phenyl. The substituents for phenyl include one or more of the same or different non-interfering groups such as halogen (chlorine, bromine, iodine); alkyl, particularly lower alkyl ($C_1$–$C_7$); alkoxy, particularly lower alkoxy; nitro; phenyl; di(lower alkyl)amino; and the like. Cycloalkyl includes lower cycloalkyl of 3 to 7 carbon atoms, e.g., cyclopropyl, cyclopentyl, cyclohexyl, cycloheptyl, and the like. The aralkyl groups include phenyl-substituted lower alkyl such as benzyl, and the like, wherein phenyl may also be substituted as described above. Heteroaryl groups include quinolyl, isoquinolyl, benzofuryl, benzothienyl, indolyl, and the like.

Typical anions include halide (chloride, bromide, iodide) methosulfate, tosylate, perchlorate, nitrate, and others derived from strong acids.

The N-alkylimines and salts (II) can be prepared by three different methods as follows, where R, R', R'' and A⁻ are as defined above.

Method 1: Known carbonyl compounds related to thiothiophthene are condensed with an aromatic, carbocyclic or heterocyclic primary monoamine or diamine in refluxing acetic acid:

[reaction scheme]

The carbonyl compound must be aldehydic and not ketonic or the reaction fails.

Method 2: A known thiothiophthene is methylated as shown below to give a salt, e.g., the methiodide (I), which reacts with a primary amine in acetic acid, liberating methyl mercaptan and giving the desired imine in the form of its hydriodide salt. The salt is converted to the free base by treatment with a base such as an alkali hydroxide, silver oxide, or pyridine.

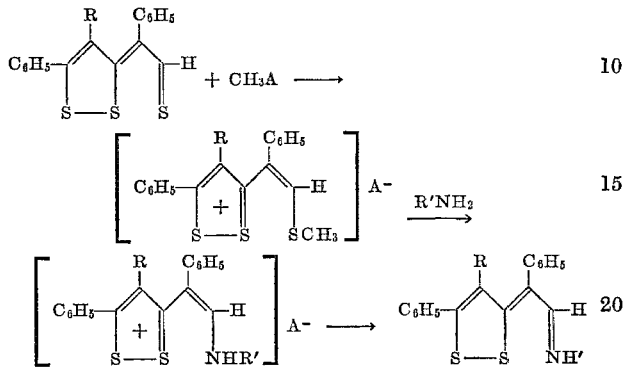

Here the thiocarbonyl carbon must be aldehydic and not ketonic or the methylation reaction does not succeed. The substituted (methylthiovinyl)-,2-dithiolium salt (I) intermediates themselves exhibit biocidal activity.

Like Method 1, this second method can be used with aromatic and heterocyclic primary monoamines and diamines. Unlike Method 1, however, it also succeeds with alkyl, cycloalkyl, and aralkyl monoamines and diamines.

Method 3: In this method a known thiothiophthene reacts with sulfur dichloride to give an intermediate of unknown structure which further reacts with aniline to give the same product obtained by Methods 1 and 2.

Preparation of alkylthiovinyl isothiazolium salts (III)

These are obtained from the imines by direct alkylation at sulfur as shown below. The products are isomeric with the N-alkyl derivatives.

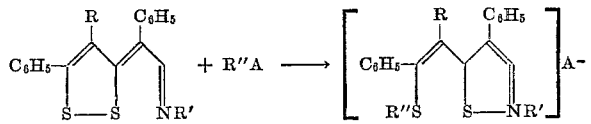

Preparation of N-substituted aminovinyl 1,2-dithiolium salts (V)

These are obtained by a variant of Method 2 in which a secondary amine is used instead of a primary amine. The product is a substituted dithiolium salt.

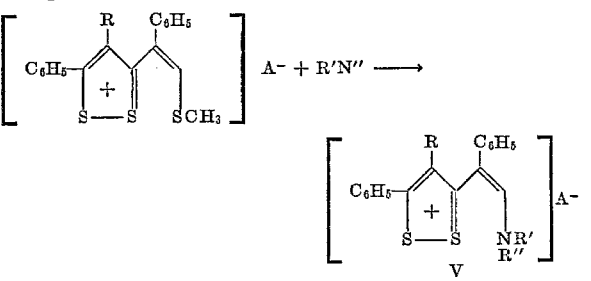

The reactions described above occur readily under mild conditions, typically with gentle agitation at steam bath or reflux temperature. An excess of any reactant generally may be employed and reaction pressure, while conveniently atmospheric, may be sub- or superatmospheric with appropriate adjustment of reaction temperature. Likewise, order of addition is not critical and conventional separation and purification procedures may be utilized. In each method of preparation the reactants are known and available materials.

The following nonlimiting examples illustrate the various compounds and processes of this invention. Degrees of temperatuer are in centigrade.

EXAMPLE 1

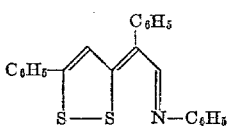

3,5-epidithio-2,5-diphenyl-2,5-pentadienylideneaniline

A mixture of 3,5-epidithio-2,5-diphenyl-2,4-pentadienal (10 grams) and 3.50 milliliters aniline was warmed in 50 milliliters acetic acid for two hours on a steam bath. The product was filtered and crystallized from toluene, nitromethane, or methylcyclohexane to give orange crystals, melting point 199–200°.

Analysis.—Calcd. for $C_{23}H_{17}NS_2$ (percent): C, 74.4; H, 4.6; S, 17.3. Found (percent): C, 74.4; H, 4.4; S, 17.3.

This compound gives orange dyeings on polyester and other synthetic fibers.

EXAMPLE 2

This compound was prepared from 6.2 grams p-bromoaniline instead of aniline according to the procedure of Example 1. The preparation gave red crystals, melting point 196–7°, from methylcyclohexane.

Analysis.—Calcd. for $C_{23}H_{16}BrNS_2$ (percent): C, 61.3; H, 3.6; N, 3.1; S, 14.3. Found (percent): C, 61.3; H, 3.7; N, 3.3; S, 14.3.

EXAMPLE 3

This compound was prepared from 4.6 grams p-anisidine by the procedure of Example 1. The reaction gave orange crystals, melting point 161°, from hexane.

Analysis.—Calcd. for $C_{24}H_{19}ONS_2$ (percent): C, 72.0; H, 4.7; N, 3.5; S, 16.0. Found (percent): C, 72.3; H, 4.6; N, 3.4; S, 15.9.

The product gives orange dyeings on polyester, nylon, acetate, and other synthetic fabrics.

EXAMPLE 4

This compound was prepared from 5.2 grams p-nitroaniline by the procedure of Example 1, using 30 milliliters acetic acid. The reaction gave purple crystals melting point 217° from toluene.

Analysis.—Calcd. for $C_{23}H_{16}O_2N_2S_2$ (percent): C, 66.4; H, 3.8; N, 6.7; S, 15.4. Found (percent): C, 66.6; H, 3.6; N, 6.5; S, 15.3.

This product gives red-violet dyeings on polyester which fluoresce brilliant red.

EXAMPLE 5

This compound was prepared from 4.5 grams p-phenylenediamine according to the procedure of Example 1 using 30 milliliters acetic acid. The procedure gave purple crystals, melting point 299°, from pyridine.

*Analysis.*—Calcd. for C₄₀H₂₈N₂S₄ (percent): C, 72.3; H, 4.2; N, 4.2; S, 19.3. Found (percent): C, 72.1; H, 4.1; N, 4.2; S, 18.9.

The product gives red-brown dyeings on polyester, nylon, acetate, and other synthetics.

If m-phenylene diamine is used in place of p-phenylenediamine, the corresponding diimine is obtained.

EXAMPLE 6

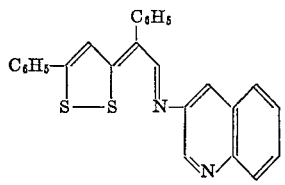

This compound was prepared from 5.4 grams 3-aminoquinoline by the procedure of Example 1 using 30 milliliters acetic acid. The workup gave red crystals from toluene, melting point 228° (decomposition). The product dyes polyester and nylon pink.

EXAMPLE 7
Part A:

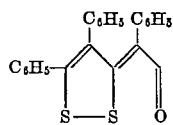

3,5-epidithio-2,4,5-triphenyl-2,4-pentadienal

A solution of 1.5 grams meribicyclo - 3,5 - epidithio-1,2,4 - triphenyl - 2,4 - pentadienethione - 1 in 150 milliliters acetic acid was stirred and refluxed for five minutes after addition of 1.50 grams mercuric acetate. Filtration of the black mixture, cooling, and dilution of the orange filtrate, gave 1.25 grams (87%) of tan solid, melting point 213–15°. Ethanol gave orange crystals, melting point 214–215.5°. There was a marked melting point depression on admixture with the isomeric 3,5-epidithio-1,2,4-triphenyl-2,4-pentadienone-1.

*Analysis.*—Calcd. for C₂₃H₁₆OS₂ (percent): C, 74.2; H, 4.3; S, 17.2. Found (percent): C, 73.8; H, 4.5; S, 17.2.

Reaction with phosphorus pentasulfide in refluxing toluene rapidly regenerated the starting thiothiophthene.
Part B:

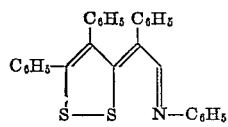

This compound was prepared from aniline and the product of Part A at reflux using the procedure of Example 1. The product gave orange crystals, melting point 180–181°, from nitromethane or methylcyclohexane.

*Analysis.*—Calcd. for C₂₉H₂₁NS₂ (percent): C, 77.9; H, 4.7; N, 3.1; S, 14.3. Found (percent): C, 78.0; H, 4.7; N, 3.1; S, 14.0.

EXAMPLE 8

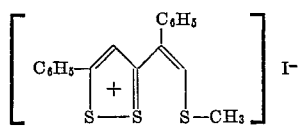

3-(2-methylthio-1-phenylvinyl)-5-phenyl-1,2-dithiolium iodide

Stirring and refluxing of a solution of 2.00 grams meribicyclo - 3,5 - epidithio - 1,4 - diphenyl - 2,4 - pentadienethione - 1 in 30 milliliters nitromethane were continued overnight after addition of 10 milliliters of methyl iodide through the condenser. Filtration followed by washing with nitromethane or benzene gave 2.65 grams (91%) of brick-red solid, melting point 180.5–181.5° (decomposition). Recrystallization from nitromethane gave purple crystals, melting point 193–4° (decomposition).

*Analysis.*—Calcd. for C₁₈H₁₅IS₃ (percent): C, 47.6; H, 3.3; I, 28.0; S, 21.1. Found (percent): C, 47.9; H, 3.4; I, 28.3; S, 21.0.

EXAMPLE 9

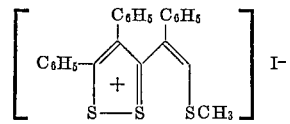

3-(2-methylthio-1-phenylvinyl)-4,5-diphenyl-1,2-dithiolium iodide

Stirring and refluxing of a solution of 0.60 gram meribicyclo - 3,5 - epidithio - 1,2,4 - triphenyl - 2,4 - pentadienethione-1 in 20 milliliters nitromethane were continued for 1.5 hours after addition of 5.0 milliliters methyl iodide through the condenser. Filtration gave 0.76 gram (93%) orange-brown solid, melting point 188–9°. Recrystallization from acetic acid gave orange crystals, melting point 189–191°.

*Analysis.*—Calcd. for C₂₄H₁₉IS₃ (percent): C, 54.4; H, 3.6; S, 18.1. Found (percent): C, 54.5; H, 3.6; S, 17.8.

EXAMPLE 10

The product of Example 1 was obtained from the product of Example 8 by refluxing for five minutes with about two equivalents of aniline in acetic acid, followed by filtration and digestion in warm water. It has the same melting point and mixed melting point.

EXAMPLE 11

The product of Example 7, Part B, was obtained from the product of Example 9 by refluxing for ten minutes with aniline in acetic acid, followed by filtration and treatment with alcoholic alkali. It had the same melting point and mixed melting point.

EXAMPLE 12

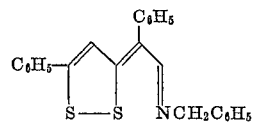

3,5-epidithio-2,5-diphenyl-2,4- pentadienylidenebenzylamine

A mixture of 0.30 milliliter benzylamine and 1.05 grams 3-(2-methylthio - 1 - phenylvinyl) - 5 - phenyl - 1,2 - dithiolium iodide (Example 8) in 5 milliliters acetic acid was stirred at reflux for five minutes, cooled, and filtered to yield 1.13 grams of brown-orange hydriodide salt melting point 185–187° decomposition. This was converted to the base by stirring in about 40 milliliters of ethanol with freshly precipitated silver oxide (from 1.0 gram of silver nitrate), followed by evaporation to dryness, extraction of the solids with hot pyridine, filtration, and dilution, yielding 0.63 gram (71%) of yellow solid, melting point 208–212°. Recrystallization from methylcyclohexane gave orange-yellow crystals, melting point 213–213.5°.

*Analysis.*—Calcd. for C₂₄H₁₉NS₂ (percent): C, 74.8; H, 4.9; S, 16.6. Found (percent): C, 74.7; H, 4.9; S, 16.8.

EXAMPLE 13

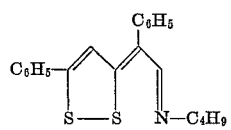

A mixture of 1.0 gram of the product of Example 8 and 0.24 milliliter n-butylamine in 5 milliliters acetic acid was stirred on a steam bath until evolution of methyl mercaptan was complete. On cooling the product separated as an oil and then solidified. It was crystallized from hexane or alcohol, melting point 123°.

EXAMPLE 14

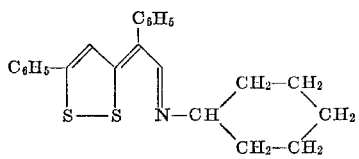

This was prepared from cyclohexylamine according to the procedure of Example 13. The yellow-orange base melted at 160°.

EXAMPLE 15

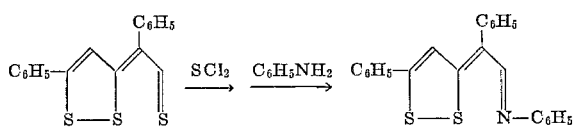

A solution of 0.62 gram meribicyclo-3,5-epidithio-1,4-diphenyl-2,4-pentadienethione-1 in 35 milliliters warm benzene was treated dropwise with 0.25 milliliter sulfur dichloride. The product was filtered and washed with a little benzene or ether; yield 0.75 gram of orange solid. This was warmed on the steam bath for five minutes in 6–7 milliliters aniline, cooled, filtered, and washed with a little methanol to yield 0.25 gram (33%) of the product of Example 1, identified by melting point, mixed melting point and analysis.

EXAMPLE 16

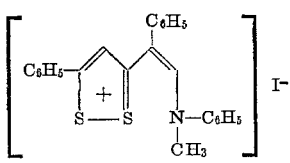

3-(2-N-methylanilino-1-phenylvinyl)-5-phenyl-1,2-dithiolium iodide

A mixture of 2.72 grams of the product of Example 8 and 0.55 milliliter N-methylaniline in 50 milliliters methanol was stirred at reflux for two hours, cooled, and filtered, yielding a small amount of 3,5 - epidithio-2,5-diphenyl-2,4-pentadienal, melting point 120°. The filtrate was evaporated to a brown residue that was triturated with ether and methanol, yielding a dark solid. This gave dark brown crystals from ether-methanol, 185° (decomposition).

*Analysis.*—Calcd. for $C_{24}H_{20}NIS_2$ (percent): C, 56.1; H, 3.9; I, 24.4; S, 12.5. Found (percent): C, 55.6; H, 3.8; I, 24.4; S, 12.2.

This product gives orange dyeings on acetate and brown-red dyeings on acrylic and modacrylic fibers.

The corresponding triiodide salt melts at 148° (decomposition).

EXAMPLE 17

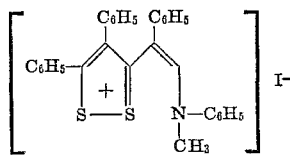

A mixture of 0.78 gram of the product of Example 9 and 0.40 milliliter N - methylaniline in 10 milliliters acetic acid was stirred and refluxed for one-half hour, cooled and filtered. The product gave metallic-green crystals from acetic acid, melting point 188° (decomposition).

EXAMPLE 18

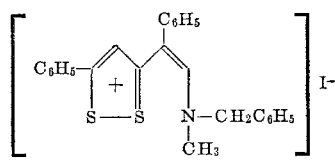

This was prepared from N-methylbenzylamine according to the procedure of Example 16. It is a brick red solid melting at approximately 210° with decomposition.

EXAMPLE 19

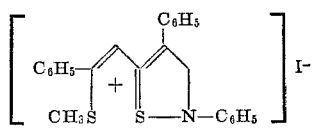

Methylation of 3,5-epidithio-2,5-diphenyl-2,4-pentadienylideneaniline

Methyl iodide (5 milliliters) was added through the condenser to a stirred refluxing mixture of 1.35 grams of the product of Example 1 in 20 milliliters of nitromethane. After one hour, the solution was cooled, diluted with a little ether, and filtered, yielding 1.85 grams (99%) of orange product. In a capillary melting point determination, it lost methyl iodide around 160° and then melted at 199–200°. Crystallization occurred readily from ethanol or methanol.

*Analysis.*—Calcd. for $C_{24}H_{20}INS_2$ (percent): C, 56.1; H, 3.9; I, 24.8; N, 2.7; S, 12.5. Found (percent): C, 56.3; H, 3.7; I, 24.7; N, 2.9; S, 12.4.

It shows herbicidal activity in solid and antibacterial activity. This product also gives brown dyeings on polyester, acetate, and polypropylene fibers. The corresponding triiodide salt melts at 150°.

EXAMPLE 20

The product of Example 2 was methylated according to the procedure of Example 19. The bronze colored product crystallized from acetic acid, melting point 193° (decomposition).

EXAMPLE 21

The product of Example 3 was methylated according to the procedure of Example 19, giving an orange methiodide, crystallizing from alcohol and melting at about 160° with decomposition.

EXAMPLE 22

The product of Example 5 was methylated with methyl iodide in nitromethane for twenty-four hours. The insoluble black bis-methiodide melted at 271° (decomposition).

I claim:
1. A compound of the formula:

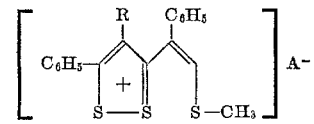

where R is hydrogen or phenyl and A⁻ is a salt forming anion.

2. A compound of the formula:

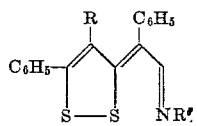

wherein R is hydrogen or phenyl, $R^1$ is alkyl of 1 to 4 carbon atoms, lower cycloalkyl of 3 to 7 carbon atoms, unsubstituted or substituted phenyl lower alkyl; unsubstituted or substituted phenyl said substituents being halogen, lower alkyl, lower alkoxy, nitro, phenyl, or di (lower alkyl) amino; or a heteroaryl selected from the group consisting of quinolyl, isoquinolyl, benzofuryl, benzothienyl or indolyl and the methiodide and methotriiodide salts thereof.

3. A compound of the formula:

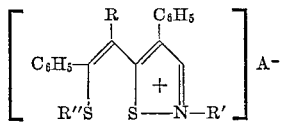

wherein R is hydrogen or phenyl, R¹ is alkyl of 1 to 4 carbon atoms, lower cycloalkyl of 3 to 7 carbon atoms, unsubstituted or substituted phenyl lower alkyl, unsubstituted or substituted phenyl; said substituents being halogen, lower alkyl, lower alkoxy, nitro phenyl, or di (loweralkyl) amino; or a heteroaryl selected from the group consisting of quinolyl, isoquinolyl, benzofuryl, benzothienyl or indolyl, R″ is lower alkyl, and A⁻ is a salt forming anion.

4. A compound of the formula:

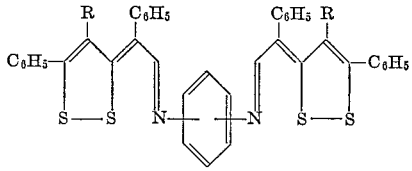

wherein R is hydrogen or phenyl.

5. A compound of the formula:

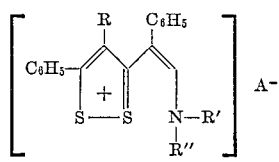

wherein R is hydrogen or phenyl, R¹ is alkyl of 1 to 4 carbon atoms, lower cycloalkyl of 3 to 7 carbon atoms, unsubstituted or substituted phenyl lower alkyl, unsubstituted or substituted phenyl; said substituents being halogen, lower alkyl, lower alkoxy, nitro, phenyl, or di (loweralkyl) amino; or a heteroaryl selected from the group consisting of quinolyl, isoquinolyl, benzofuryl, benzothienyl or indolyl, R″ is lower alkyl, and A⁻ is a salt forming anion.

6. A method of preparing the compound of claim 1 which comprises reacting a methyl salt, CH₃⁺A⁻ where A⁻ is a salt forming anion, with a compound of the formula:

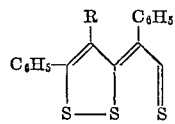

where R is hydrogen or phenyl.

7. A method of preparing the compound of claim 2 in the form of its free base which comprises reacting in the presence of acetic acid a compound of the formula:

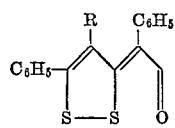

wherein R is hydrogen or phenyl with R¹—NH₂, wherein R¹ is unsubstituted or substituted phenyl lower alkyl; unsubstituted or substituted phenyl, said substituents being halogen, lower alkyl, lower alkoxy, nitro, phenyl, or di (loweralkyl) amino; or a heteroaryl selected from the group consisting of quinolyl, isoquinolyl, benzofuryl, benzothienyl or indolyl.

8. A method of preparing the compound of claim 2 in the form of its free base which comprises reacting in the presence of acetic acid a compound of claim 1 with R¹—NH₂ where R¹ is an alkyl of 1 to 4 carbon atoms, lower cycloalkyl of 3 to 7 carbon atoms, unsubstituted or substituted phenyl lower alkyl, unsubstituted or substituted phenyl; said substituents being halogen, lower alkyl, lower alkoxy, nitro, phenyl, or di (loweralkyl) amino; or a heteroaryl selected from the group consisting of quinolyl, isoquinolyl, benzofuryl, benzothienyl or indolyl, and thereafter heating with a base.

9. A method of preparing the compound of claim 2 in the form of its free base which comprises reacting a thiothiophthene of the formula:

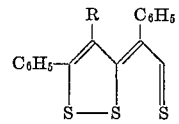

wherein R is phenyl or hydrogen, with sulfur dichloride in an inert hydrocarbon solvent, and reacting the resultant reaction product with a primary aromatic amine of the formula R¹—NH₂ where R¹ unsubstituted or substituted phenyl, said substituents being halogen, lower alkyl, lower alkoxy, nitro, phenyl, or di (loweralkyl) amino.

10. A method of preparing the compound of claim 3 which comprises reacting a compound of claim 2 in the form of its free base, with a lower alkyl halide.

11. A method of preparing the compound of claim 4 which comprises reacting in the presence of acetic acid a compound of the formula:

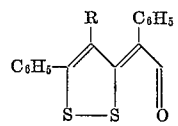

wherein R is hydrogen or phenyl with a phenylenediamine.

12. A method of preparing the compound of claim 5 which comprises reacting in the presence of acetic acid a compound of claim 1 with R¹ NRH″ where R¹ is alkyl of 1 to 4 carbon atoms, lower cycloalkyl of 3 to 7 carbon atoms, unsubstituted or substituted phenyl lower alkyl, unsubstituted or substituted phenyl; said substituents being halogen, lower alkyl, lower alkoxy, nitro, phenyl, or di (loweralkyl) amino; or a heteroaryl selected from the group consisting of quinolyl, isoquinolyl, benzofuryl, benzothienyl or indolyl, and R¹¹ is lower alkyl in acetic acid.

13. 3-(2-methylthio - 1 - phenylvinyl)-5-phenyl-1,2-dithiolium iodide.

14. 3 - (2-methylthio - 1 - phenylvinyl)-4,5-diphenyl-1,2-dithiolium iodide.

15. 3,5 - epidithio - 2,5 - diphenyl-2,4-pentadienylideneaniline.

16. The methiodide salt of the compound of claim 15.

17. 3,5 - epidithio - 2,4,5 - triphenyl-2,4-pentadienylideneaniline.

18. The methiodide salt of the compound of claim 17.

References Cited

Chemical Abstracts 64: 3512-3 Jan. 31, 1966, Fautst, et al.

HENRY R. JILES, Primary Examiner

C. M. SHURKO, Assistant Examiner

U.S. Cl. X.R.

8—37; 260—240.1, 327, 999

UNITED STATES PATENT OFFICE
CERTIFICATE OF CORRECTION

Patent No. 3,575,968   Dated April 20, 1971

Inventor(s) Erwin Klingsberg

It is certified that error appears in the above-identified patent and that said Letters Patent are hereby corrected as shown below:

Column 2, line 43, "substittued" should read --substituted--.

Column 3, line 25, after the word "substituted", "(meth thiovinyl)-,2-dithiolium" should read --(methylthiovinyl-1,2 dithiolium--.

Column 3, line 49, "A⁻ + R'N''" should read --A⁻ + R'NH

Column 4, line 8, after "diphenyl-2,", 5-pentadienylide aniline should read --4-pentadienylideneaniline--.

Column 5, line 39, after the word "gave", "1,25" shoulc read --1.25--.

Signed and sealed this 24th day of August 1971.

(SEAL)
Attest:

EDWARD M. FLETCHER, JR.
Attesting Officer

WILLIAM E. SCHUYLER, JR.
Commissioner of Patents